(No Model.)
M. BLAKEY.
PROTECTOR FOR PIPE THREADS.
No. 509,115. Patented Nov. 21, 1893.
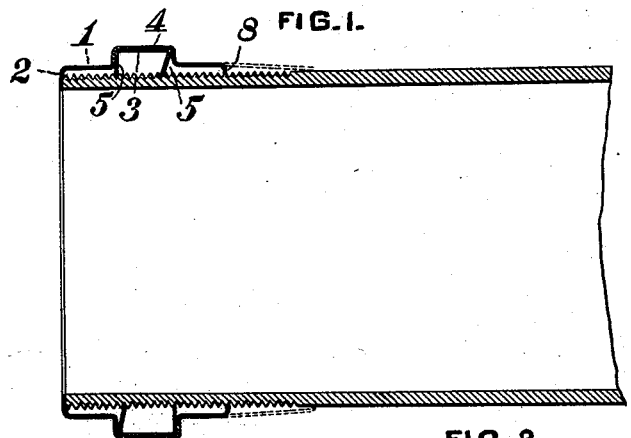
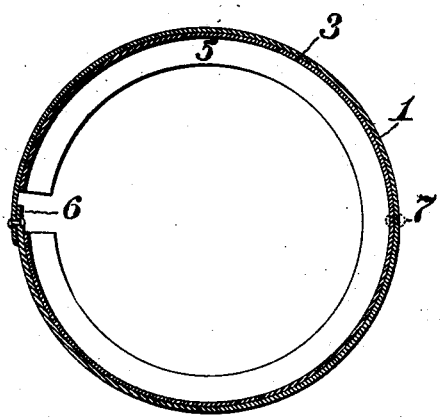
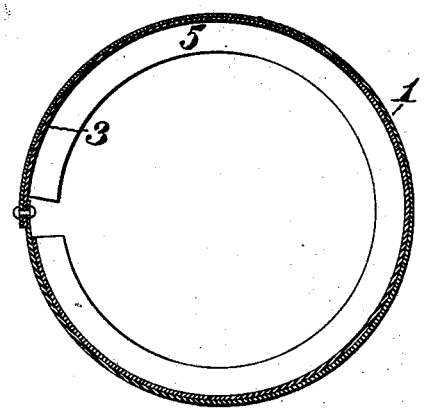
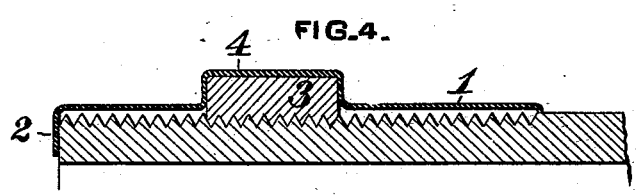
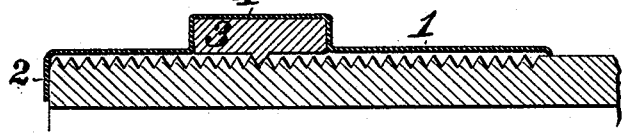
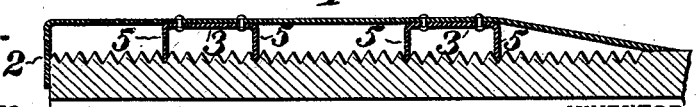
WITNESSES: Danning S. Wolcott, T. E. Gaither
INVENTOR, Mildred Blakey, by George H. Christy, Att'y.
THE NATIONAL LITHOGRAPHING COMPANY,
WASHINGTON, D. C.

UNITED STATES PATENT OFFICE.

MILDRED BLAKEY, OF HAZELWOOD, PENNSYLVANIA.

PROTECTOR FOR PIPE-THREADS.

SPECIFICATION forming part of Letters Patent No. 509,115, dated November 21, 1893.

Application filed January 14, 1893. Serial No. 458,420. (No model.)

*To all whom it may concern:*

Be it known that I, MILDRED BLAKEY, a citizen of the United States, residing at Hazelwood, in the county of Allegheny and State of Pennsylvania, have invented or discovered certain new and useful Improvements in Protectors for Pipe-Threads, of which improvement the following is a specification.

The invention described herein relates to certain improvements in protectors for the threads of pipes during transportation and storage, and has for its object a construction wherein the protector extends entirely over the threaded portions of the pipe and is held in place by supplemental ring or keeper engaging the threads on the pipe and also serving to strengthen and hold the protector away from the threads.

In general terms the invention consists in the construction and combination substantially as hereinafter described and claimed.

In the accompanying drawings forming a part of this specification, Figure 1 is a sectional elevation of a portion of a pipe having my improvement applied thereto. Figs. 2 and 3 are transverse sections taken on the line x, x, Fig. 1, Fig. 3 showing certain modifications. Figs. 4, 5 and 6 are views similar to Fig. 1, and illustrate modifications in the construction of my improved protector.

The protecting sleeve 1 is made of sheet metal or other suitable material, and of a diameter somewhat greater than the external diameter of the pipe to which the protector is to be applied. This sleeve is provided at its outer end with an inwardly projecting flange 2 adapted to bear upon the end of the pipe and thereby prevent the sleeve from passing so far upon the pipe as to uncover the threads at the end.

A ring 3 for holding the sleeve in position longitudinally and also for supporting the sleeve radially is arranged within a peripheral recess or seat 4 in the sleeve or is held in position longitudinally of the sleeve by rivets or other suitable means. This ring when made of sheet metal as shown in Figs. 1, 2 and 3, is provided with flanges 5 at one or both ends, and the ring is so twisted or the flange or flanges are so bent that the latter will form a thread or threads corresponding to the pitch of the threads of the pipe to which the protector is to be applied. This ring may be sprung into the seat 4, and be rotated with the sleeve when the latter is being applied to or removed from the pipe, by contact of one of the ends of the ring with the shoulder 6 formed in riveting the sleeve as shown in Fig. 2. If desired, the ring may be attached to the sleeve so as to rotate therewith by a rivet 7 indicated by dotted lines in Fig. 2, or one end of the ring may be held between the united edges of the sleeve as shown in Fig. 3, the opposite end remaining loose.

As shown in Figs. 4 and 5, the ring may be made of material sufficiently thick to permit of the formation of threads on its inner wall, by rolling or cutting and as shown in Fig. 5, the ring may be formed of a single median thread. If the threaded portion of the pipe is of considerable length, two or more rings may be employed to hold the sleeve away from the threads, as shown in Fig. 6.

The sleeve is made of sufficient length to extend entirely over the threads, the inner end of the sleeve of slightly greater diameter than the pipe; or, if desired, the inner end of the pipe may be provided with an inwardly projecting flange 8 adapted to hold the sleeve a short distance away from the threads.

By employing a split or divided ring for holding the protecting sleeve in position, the ring may be made slightly less in its internal diameter than the external diameter of the pipe to which it is to be applied, so that it will hold tightly to the pipe, thus avoiding accidental displacement of the protecting sleeve.

I claim herein as my invention—

1. In a protector for the threads of pipes, the combination of a sleeve and an internally threaded split ring arranged within the sleeve, and held as against longitudinal movement independent of the sleeve, substantially as set forth.

2. In a protector for the threads of pipes, the combination of a sleeve provided at its front end with an inwardly projecting flange adapted to bear against the end of the pipe, and an internally threaded split ring arranged within the sleeve and held as against longitudinal movement independent of the sleeve, substantially as set forth.

3. In a protector for the threads of pipes, the combination of a sleeve provided with a peripheral recess or seat and an internally threaded split ring arranged within said recess or seat, substantially as set forth.

4. In a protector for the threads of pipes, the combination of a sleeve and a sheet metal ring provided with a spiral flange projecting inwardly, arranged within the sleeve, and held as against longitudinal movement independent of the sleeve, substantially as set forth.

In testimony whereof I have hereunto set my hand.

MILDRED BLAKEY.

Witnesses:
GEORGE BLAKEY,
JOHN L. MOORE.